United States Patent
Schnurr

(10) Patent No.: US 8,831,209 B2
(45) Date of Patent: *Sep. 9, 2014

(54) CONFERENCE CALL DIALING

(75) Inventor: Jeffrey R. Schnurr, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1814 days.

This patent is subject to a terminal disclaimer.

(21) Appl. No.: 11/561,172

(22) Filed: Nov. 17, 2006

(65) Prior Publication Data

US 2007/0121909 A1    May 31, 2007

Related U.S. Application Data

(63) Continuation of application No. 10/837,677, filed on May 4, 2004, now Pat. No. 7,162,025.

(51) Int. Cl.
*H04M 1/00* (2006.01)
*H04M 1/725* (2006.01)
*H04L 12/66* (2006.01)
*H04M 1/2745* (2006.01)
*H04M 3/56* (2006.01)
*H04M 3/38* (2006.01)

(52) U.S. Cl.
CPC ...... *H04M 1/72552* (2013.01); *H04M 1/72583* (2013.01); *H04L 12/66* (2013.01); *H04M 3/382* (2013.01); *H04M 2250/62* (2013.01); *H04M 1/2745* (2013.01); *H04M 3/56* (2013.01)
USPC .................................. 379/355.07; 379/204.01

(58) Field of Classification Search
CPC .............. H04M 1/274566; H04M 2203/5063; H04M 3/567; H04M 2203/5054; H04M 2201/38
USPC ............ 379/93.23, 352, 354, 355.02, 355.07, 379/355.08, 355.09, 202.01, 204.01, 379/205.01, 92.23, 93.21, 158, 355.05; 455/416; 370/260, 261, 262, 263, 266
See application file for complete search history.

(56) References Cited

U.S. PATENT DOCUMENTS

| 4,964,156 | A | * | 10/1990 | Blair | 379/189 |
| 5,634,196 | A | * | 5/1997 | Alford | 455/18 |
| 5,903,631 | A | * | 5/1999 | Smith et al. | 379/90.01 |
| 6,510,235 | B1 | * | 1/2003 | Shin et al. | 382/100 |
| 6,754,323 | B1 | * | 6/2004 | Chang et al. | 379/205.01 |
| 6,876,734 | B1 | * | 4/2005 | Summers et al. | 379/202.01 |
| 7,162,025 | B2 | * | 1/2007 | Schnurr | 379/355.07 |
| 7,209,947 | B1 | * | 4/2007 | Lee et al. | 709/204 |
| 8,064,954 | B1 | * | 11/2011 | Fujisaki | 455/556.1 |
| 2002/0080179 | A1 | * | 6/2002 | Okabe et al. | 345/769 |

* cited by examiner

*Primary Examiner* — Fan Tsang
*Assistant Examiner* — Akelaw Teshale

(57) ABSTRACT

A communication device recognizes a first string of characters as a telephone number and a second string of characters as additional information related to the telephone number. A menu is then displayed having a menu item including the telephone number and the additional information. When the user has selected the menu item, the telephone number and the additional information are provided to a telephone application of the communication device.

22 Claims, 7 Drawing Sheets

CONFERENCE CALL DIALING

CROSS-REFERENCE TO RELATED APPLICATION

This application is a continuation of application Ser. No. 10/837,677 filed on May 4, 2004 now U.S. Pat. No. 7,162,025, the contents of which are incorporated herein by reference.

FIELD OF THE INVENTION

The present invention relates to character recognition and, more particularly, to initiating a telephone call that requires information in addition to a telephone number, based on recognition of the telephone number and the additional information.

BACKGROUND

With the increasing amalgamation of functions on single electronic communication devices, users may now use a single device that combines a telephone application, a calendar application, a World Wide Web browsing application and an application for composing and reading e-mail. As will be apparent to a person skilled in the art, the single electronic tool may exist in a range of devices that includes desktop computers, mobile telephones and wireless personal digital assistants (PDAs).

Along with person to person calls, the telephone application of the electronic communication device may be required to call in to conference calls. Participation in such conference calls has been simplified of late through the use of conference bridge systems. To join a conference call handled by a conference bridge system, participants call a central telephone number unique to the conference bridge system and, once connected to the conference bridge system, participants enter a passcode, which is a unique key that allows the participants to join a particular conference call.

Information about a given conference call, i.e., the telephone number of the conference bridge system and the passcode of the given conference call, which collectively may be called conference call datum, may be received, by a potential participant in the given conference call, in an e-mail. Additionally, conference call datum may be posted on a website or may have been added to the calendar application maintained by the potential participant. Unfortunately, where the conference call datum is not available separately from the device (e.g., on a piece of paper), to enter the conference call datum into the telephone application, the potential participant is required to repeatedly switch between the application in which the conference call datum appears (e-mail reading application, web browsing application, calendar application) and the telephone application.

SUMMARY

By recognizing character strings that form a telephone number and additional information, such as conference call datum, an electronic communication device may initiate use of a telephone application to place a call based on a string of characters recognized as the telephone number and a string of characters recognized as the additional information. The recognized character strings may be recognized in a collection of characters in any of the applications executed by the electronic communication device to display text.

In accordance with an aspect of the present invention there is provided a method of initiating a telephone call on a communication device. The method includes recognizing a first string of characters displayed on a display of the communication device as a telephone number, recognizing a second string of characters displayed on the display as additional information related to the telephone number, causing a menu to be displayed on the display, where the menu includes a menu item including the first string of characters and the second string of characters and, responsive to determining that the user has selected the menu item, providing the first string of characters and the second string of characters to a telephone application of the communication device. In other aspects of the invention, a communication device is provided that is adapted to perform this method and a computer readable medium is provided to adapt a processor in a communication device to perform the method.

In accordance with another aspect of the present invention there is provided a communication device including a display and a processor. The processor is adapted to execute a first application to recognize a first string of characters to be displayed on the display as a telephone number, recognize a second string of characters to be displayed on the display as additional information related to the telephone number, cause a menu to be displayed on the display, where the menu includes a menu item including the first string of characters and the second string of characters and provide the first string of characters and the second string of characters to a telephone application of the communication device, responsive to determining that the user has selected the menu item.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 7:
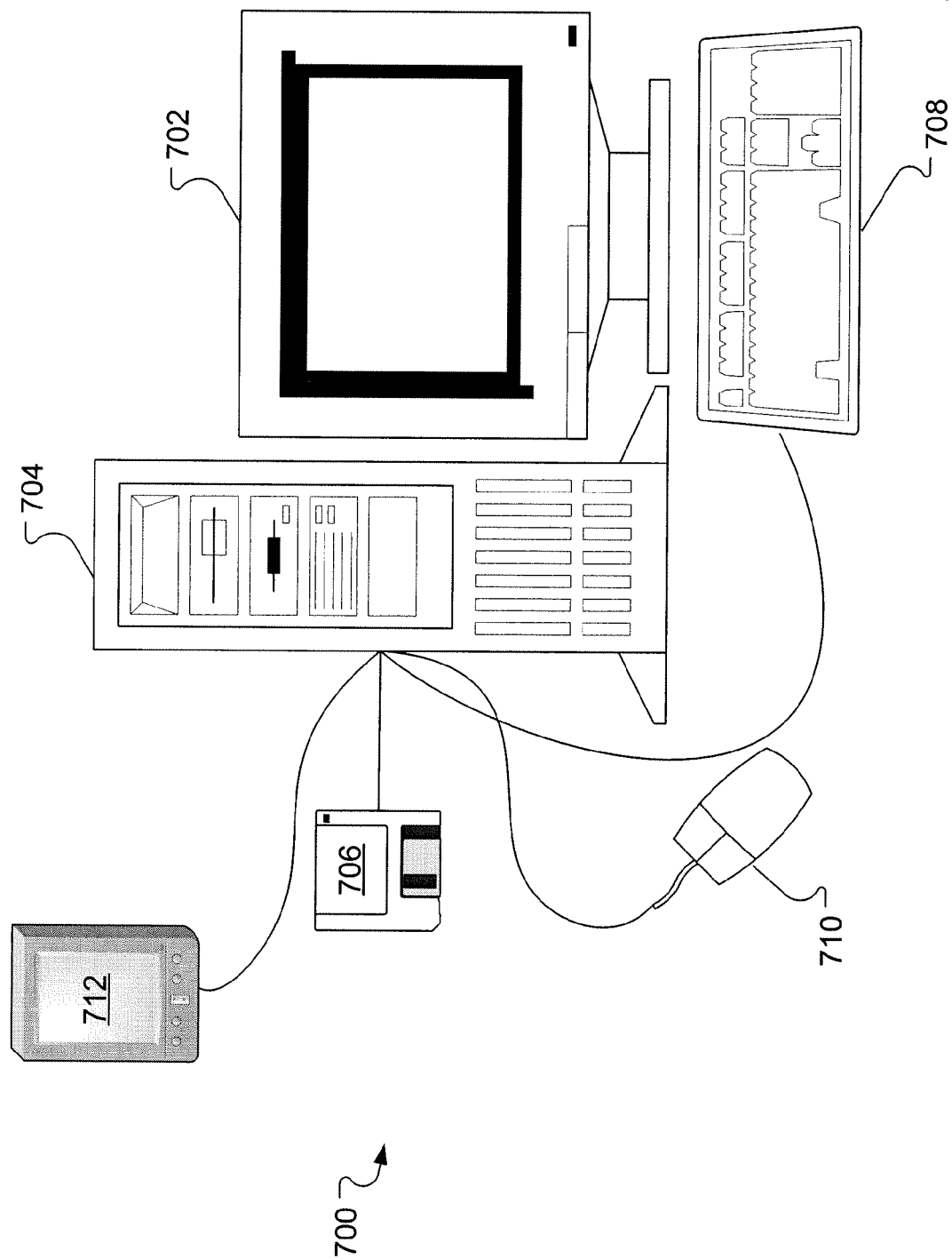
FIG. 7 illustrates a desktop computing system and a mobile communication device, both of which may carry out methods exemplary of embodiments of the present invention.

A desktop computing system 700, which may, at least in part, be considered a communication device for performing methods exemplary of the present invention, is illustrated in FIG. 7. The desktop computing system 700 includes a display monitor 702 and a central processing unit 704. The central processing unit 704 may include hardware to communicate with other computers (over local and/or wide area networks), long term and short term memory and a processor. As is typical, connected to the central processing unit 704 may be multiple input peripherals such as a keyboard 708 and a mouse 710. The desktop computing system 700 may be loaded with a computer readable instruction for executing methods exemplary of this invention from a software medium 706 which could be a disk, a tape, a chip or a random access memory containing a file downloaded from a remote source.

Also connected to the desktop computing system 700 is a mobile communication device 712. The mobile communication device 712 may also, at least in part, be considered a communication device for performing methods exemplary of the present invention. The manner in which the mobile communication device 712 connects to the desktop computing system 700 may be wired, e.g., Universal Serial Bus (USB), Firewire (IEEE 1394), serial cable, or wireless, e.g., Infrared, BlueTooth™, and IEEE 802.11. Through connection with the desktop computing system 700 or other source, the mobile communication device 712 may be loaded with computer readable instructions for executing methods exemplary of this invention from the software medium 706.

As will be clear to a person skilled in the art, the mobile communication device 712 may take the form of a standalone wireless communication device. That is, a wireless device that can browse the World Wide Web without the help of a desktop computer. Wireless devices exemplary of such a system communicate with the Internet via mobile wireless networks using protocols such as Code Division Multiple Access (CDMA), General Packet Radio Service (GPRS), Integrated Digital Enhanced Network (IDEN), Mobitex and DataTAC. Further exemplary wireless devices may use the IEEE 802.11 protocol or the wireless communication protocol known as the Universal Mobile Telecommunications System (UMTS).

Conference call datum may be provided as illustrated in the following example: To join the call, dial +1-519-888-1920 or +1-866-839-8025 and enter access code 0198833.

In overview, a primary user interface (UI) element, which is responsible for the display and navigation of textual content, recognizes a first string of characters as a telephone number and considers the telephone number to have the potential to be a telephone number for a conference bridge. Based on the recognition, the first string of characters is emphasized such that the attention of the user is called to the first string of characters. Furthermore, the primary UI element scans characters surrounding the first string of characters to attempt to recognize one or more second strings of characters as possible passcodes. Upon recognizing a second string of characters as a possible passcode, the second string of characters is emphasized in a manner similar to the emphasis of the first string of characters.

Responsive to the user performing some act to acknowledge the emphasized first or second string of characters, say, by pointing at the first string of characters with a mouse pointer and clicking the mouse in a conventional manner, a secondary UI element may present a menu wherein the possible passcodes (the secondary strings of characters) are presented, associated with the first string of characters. Menu items in the menu may include the first string of characters with one of the possible passcodes appended thereto. The user may make a selection of a particular one of the menu items to use to call in to a conference call. The telephone application may then be initiated and passed the first string of characters to use in initiating a call. Once connected, and after a pause, the selected secondary string of characters may be passed to the receiving conference bridge system by the telephone application, based on instructions from the secondary UI element.

As will be clear to a person skilled in the art, the recognition of characters as relating to specific types of text and then offering related functions and commands is known and implementations vary dependent upon the function, the application and the operating system, among other factors. One implementation, included in Microsoft® Word 2002 and Excel 2002, is called a "smart tag". A smart tag has two basic parts, a recognizer element and an action element. Both the recognizer element and the action element are Component Object Model Dynamic Link Libraries (COM DLLs).

A recognizer element is a piece of code that checks documents to identify certain types of text that have been determined to be candidates for smart tags. The text can be recognized as a type (for example, names, addresses, telephone numbers, or URLs) or by specific content (inventory item names, employee names, or branch office names). An action element is a piece of code that provides one or more commands that can be executed.

An overview of smart tags may be found at www.microsoft.com/office/previous/xp/columns/itcolumn08.asp and a software development kit for use in creating smart tags is available at www.microsoft.com/downloads/details.aspx?FamilyId=C6189658-D915-4140-908A-9A0114953721&displaylang=en.

In operation, each application for which text is presented to the user may be considered eligible for the recognition of potential conference call datum. Essentially, in any case where a telephone number and passcode could reasonably be present in text, a recognizer element, to discover and emphasize that telephone number and passcode, may be invoked. Further activity on the part of the user may be handled by invoking the action element, which may, responsive to the further activity, present the user with a menu of options. The selection of the conference call datum from the menu may then trigger the action element to provide a telephone application with the telephone number, wait a predetermined period and then provide the telephone application with the passcode.

Example applications in which embodiments of the invention may be employed include e-mail reading applications, short message service text message reading applications, calendar applications, memo pad applications, web browsing applications and word processing and spreadsheet applications for viewing attachments to e-mail messages.

The recognizer element may identify, by parsing text displayed by the primary UI, a first string of characters in a document to be a potential telephone number of a conference bridge system, where the first string of characters follows the pattern of a telephone number, i.e., for North America, 10 or 11 sequential digits separated by delimiters. The recognizer element may then emphasize the first string of characters such that the attention of the user is called to the potential telephone number.

As will be appreciated by those skilled in the art, a delimiter may include brackets, dashes and spaces and many patterns may be recognized as a telephone number dependent upon country standards. Furthermore, an internal extension may also be recognized as having a pattern of a telephone number, for example, a string of three digits starting with a "3".

Additionally, the recognizer element may identify a second string of characters to be a potential passcode, where the second string of characters follows the pattern of a passcode, e.g., a string of two to eight consecutive digits, possibly terminated by an octothorpe (#). The recognizer element may then emphasize the second string of characters such that the attention of the user is called to the potential passcode.

In one embodiment, underlining the potential conference call datum in a display emphasizes the potential conference call datum. Other ways of emphasizing the potential conference call datum include highlighting the datum, i.e., altering the color of the background of the datum. Additionally, the datum may be caused to blink on and off or the text size, style or font may be changed.

Responsive to scrolling through the document by the user, the emphasized text may be further emphasized, for example, rendered in bold type, in the sequence in which the emphasized text occurs in the document. For instance, as a user scrolls to the potential telephone number, the underlined telephone number may be rendered in bold type. Subsequently, responsive to further scrolling, the underlined passcode may be rendered in bold type. Alternatively, the underlined text may be rendered in bold type in response to a "mouse-over" event, as is well understood in the UI art.

While a string of potential conference call datum is rendered in bold type, i.e., while the UI recognizes that the attention of the user is focused on the potential telephone number or the potential passcode, further activity by the user may trigger the action element to produce a menu of options.

Conventionally, the menu of options is limited to placing a regular call to the potential telephone number, sending a Short Message Service (SMS) message to the potential telephone number and/or adding the potential telephone number to a contact management application. One of the menu options may then be selected through further activity by the user, such as clicking a mouse button while the menu option representative of the preferred option is emphasized, or, equally, depressing a joystick on a mobile telephone or placing inward pressure on a side-mounted thumbwheel on a mobile communication device. Where the further activity, e.g., the clicking, is dependent upon the design of the physical input device.

In accordance with embodiments of the present invention, one option (menu item) may relate to placing a call to the potential telephone number and, after a suitable pause, transmitting the potential passcode.

Figure 1:
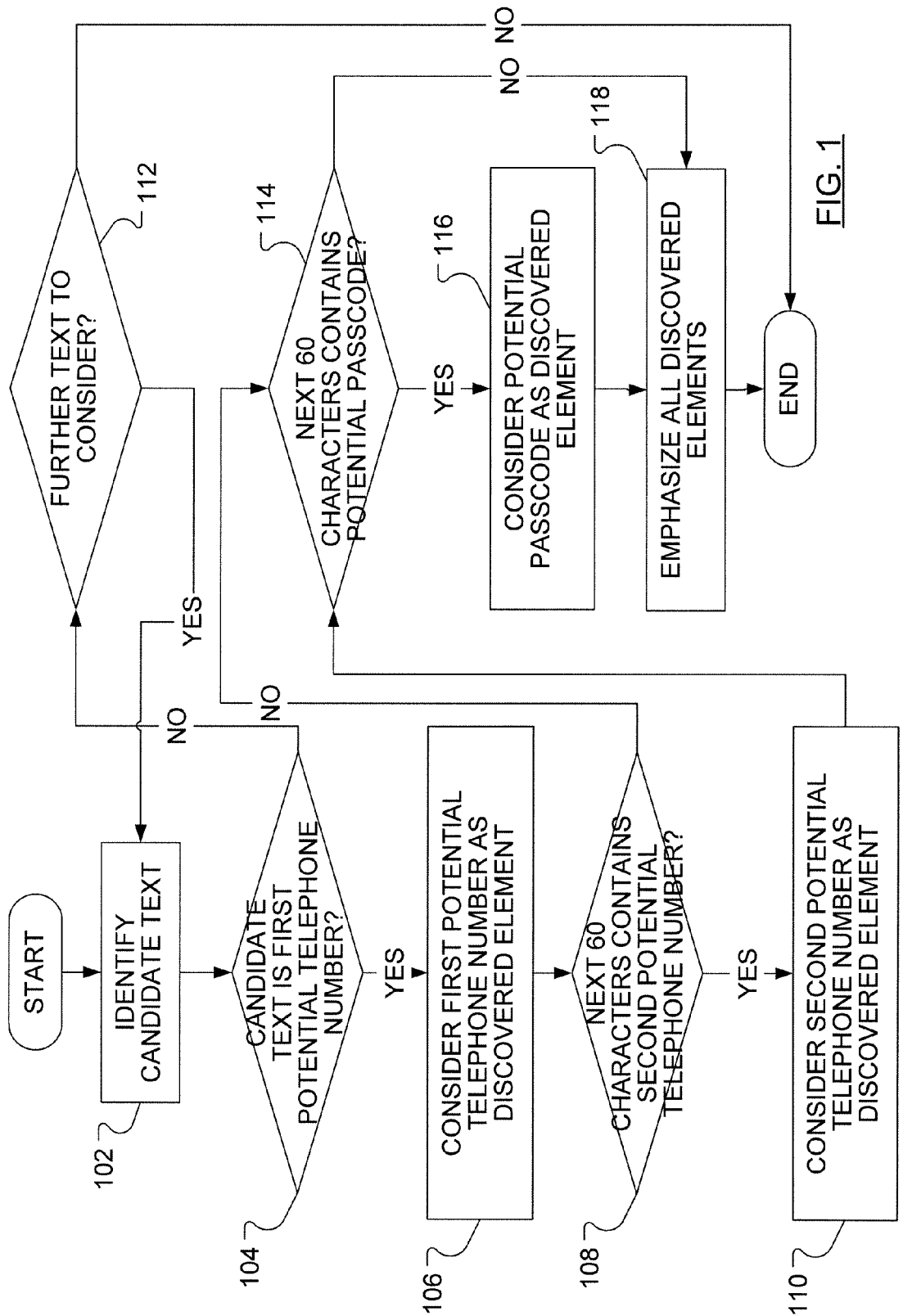
FIG. 1 illustrates steps in a method of operation of a recognizer element of a user interface of a communication device.
Figure 3:
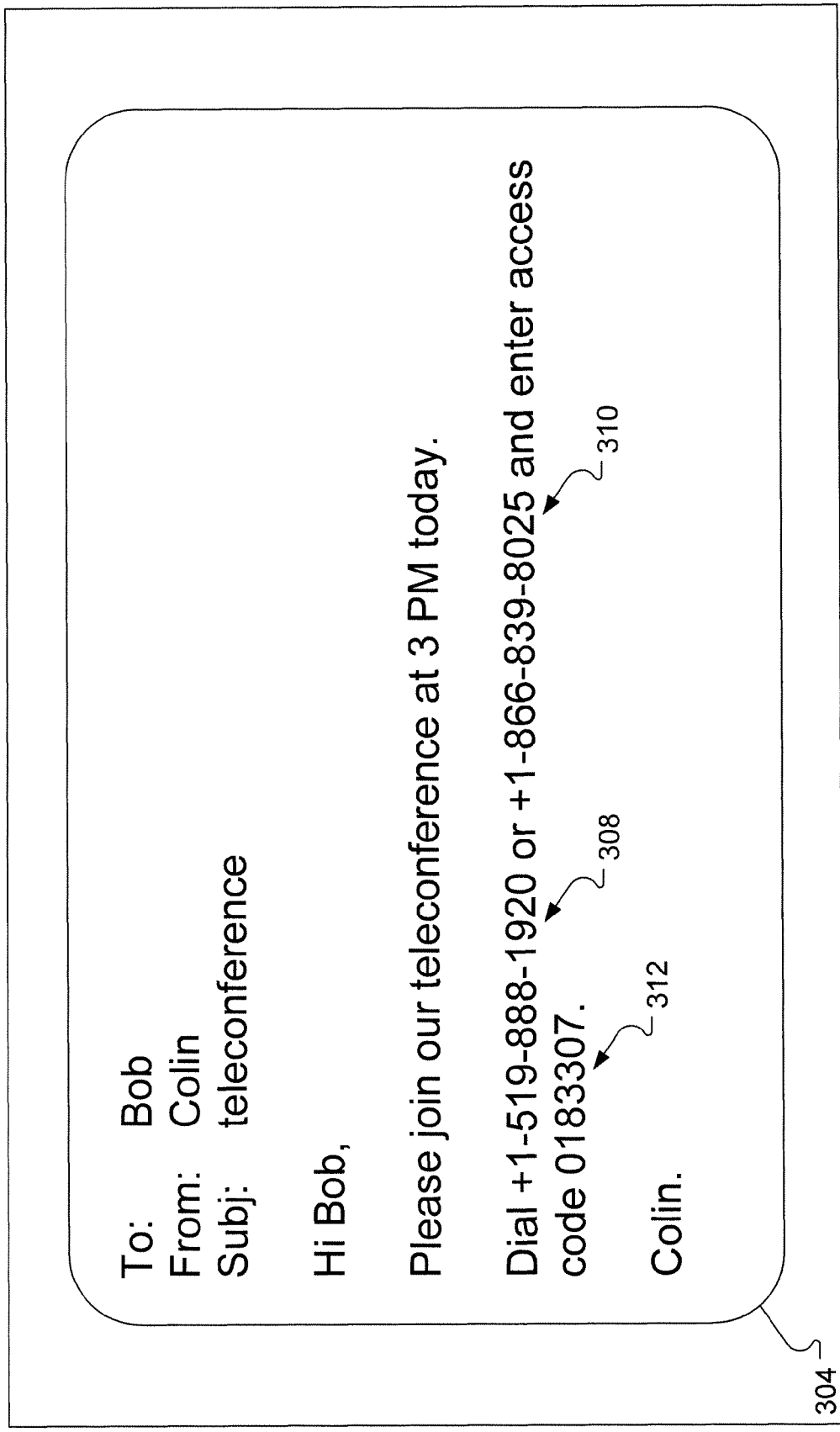
FIG. 3 illustrates a simplified communication device with a display displaying an e-mail message.
Figure 4:
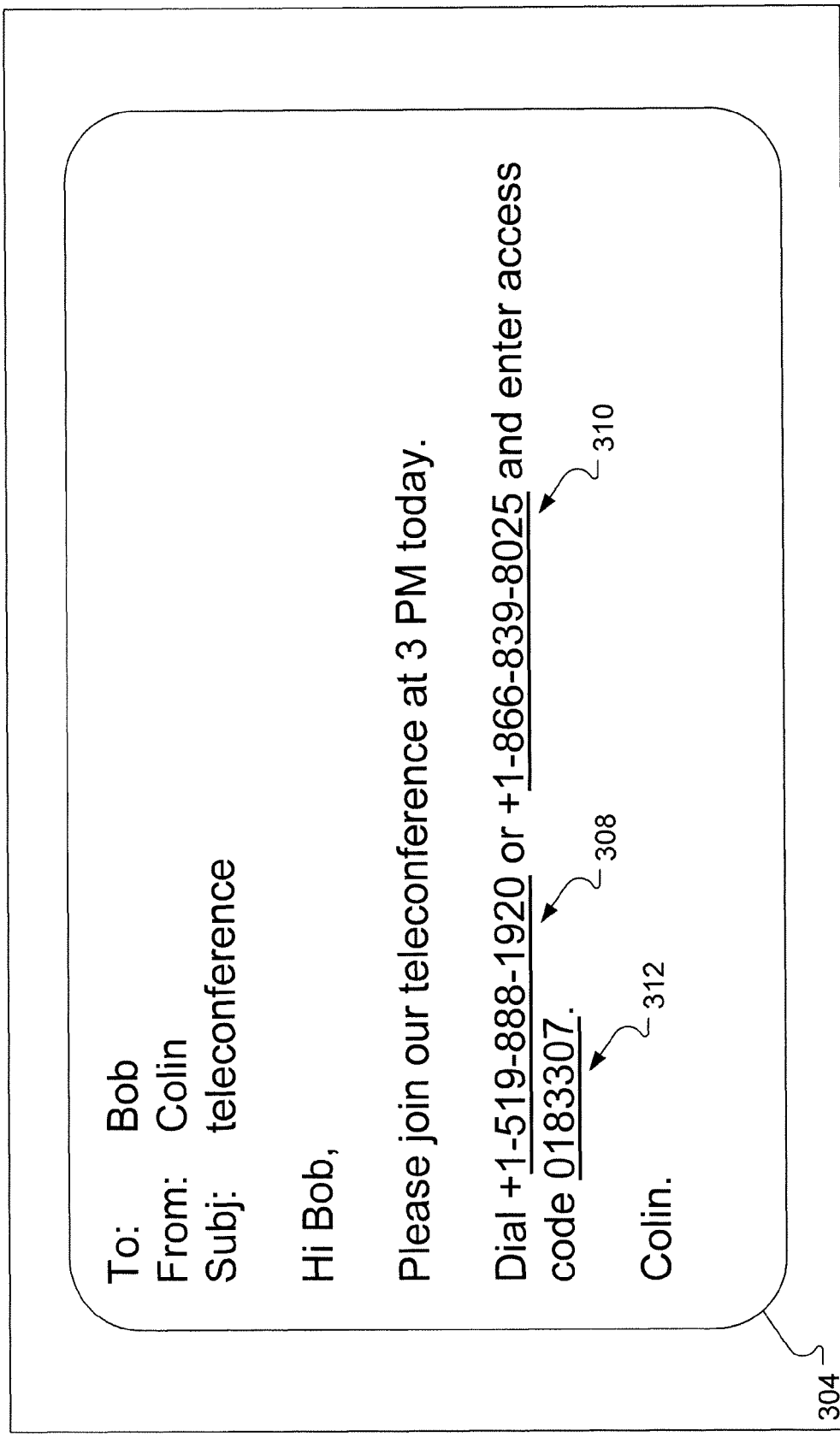
FIG. 4 illustrates the simplified communication device of FIG. 3, where conference datum within the e-mail message has been recognized.

Exemplary steps in a method of operation of the recognizer element, which are outlined in FIG. 1, may be considered in conjunction with FIGS. 3 and 4. FIG. 3 presents a simplified illustration of a communication device 302 having a display 304. Aspects of the present invention may be implemented on a wide range of communication devices that includes desktop computers, mobile telephones and wireless personal digital assistants (PDAs). The display 304 of the communication device 302 in FIG. 3 is illustrated to be displaying an e-mail message inviting the recipient to join a teleconference. The e-mail includes a reference to a first telephone number 308, a second telephone number 310 and an access code 312.

Initially, a first string of candidate text, say, the first telephone number 308 in the e-mail shown on the display 304, is identified (step 102). It is then determined whether the first string of candidate text conforms to the pattern of a telephone number (step 104). If the first string of candidate text conforms to the pattern of a telephone number, the first string of candidate text is then considered to be a discovered element (step 106). If the first string of candidate text does not conform to the pattern of a telephone number, it is determined whether there is further text to consider (step 112). If there is further text to consider, the further text is identified as a string of candidate text (step 102) and may be considered a discovered element. If there is no further text to consider, the method is complete.

Once a string of candidate text is considered to be a discovered element (step 106), it is then determined whether the next 60 characters contain a further string of candidate text, say, the second telephone number 310 in the e-mail shown on the display 304, and whether the further string of candidate text conforms to the pattern of a telephone number (step 108). If the further string of candidate text conforms to the pattern of a telephone number, then the further string of candidate text is considered to be a discovered element (step 110).

Subsequently, and if the further string of candidate text does not conform to the pattern of a telephone number, it is determined whether the next 60 characters contain a potential passcode string (step 114), say, the access code 312 in the e-mail shown on the display 304. If the next 60 characters are determined to contain a potential passcode string, then the potential passcode string is considered to be a discovered element (step 116). Once all of the text has been considered, all of the discovered elements are emphasized (step 118). FIG. 4 illustrates the display 304 on the communication device 302 updated to reflect the emphasis of the displayed e-mail message. In this case, the chosen emphasis method is an underline and each of the first telephone number 308, the second telephone number 310 and the access code 312 are underlined in FIG. 4.

As will be understood by those skilled in the art, the number, 60, of subsequent characters in which presence or absence of a further string of candidate text (step 108), or a potential passcode string (step 114), is determined is presented as an example and may be replaced by some other pre-determined set number of characters. The other pre-determined set number of characters may take a value selected from the range from 10 to 100, with a preferred range from 40 to 80. Of course, the range may differ depending on the expected length of a telephone number in the region of the world in which aspects of the invention are implemented.

Figure 2:
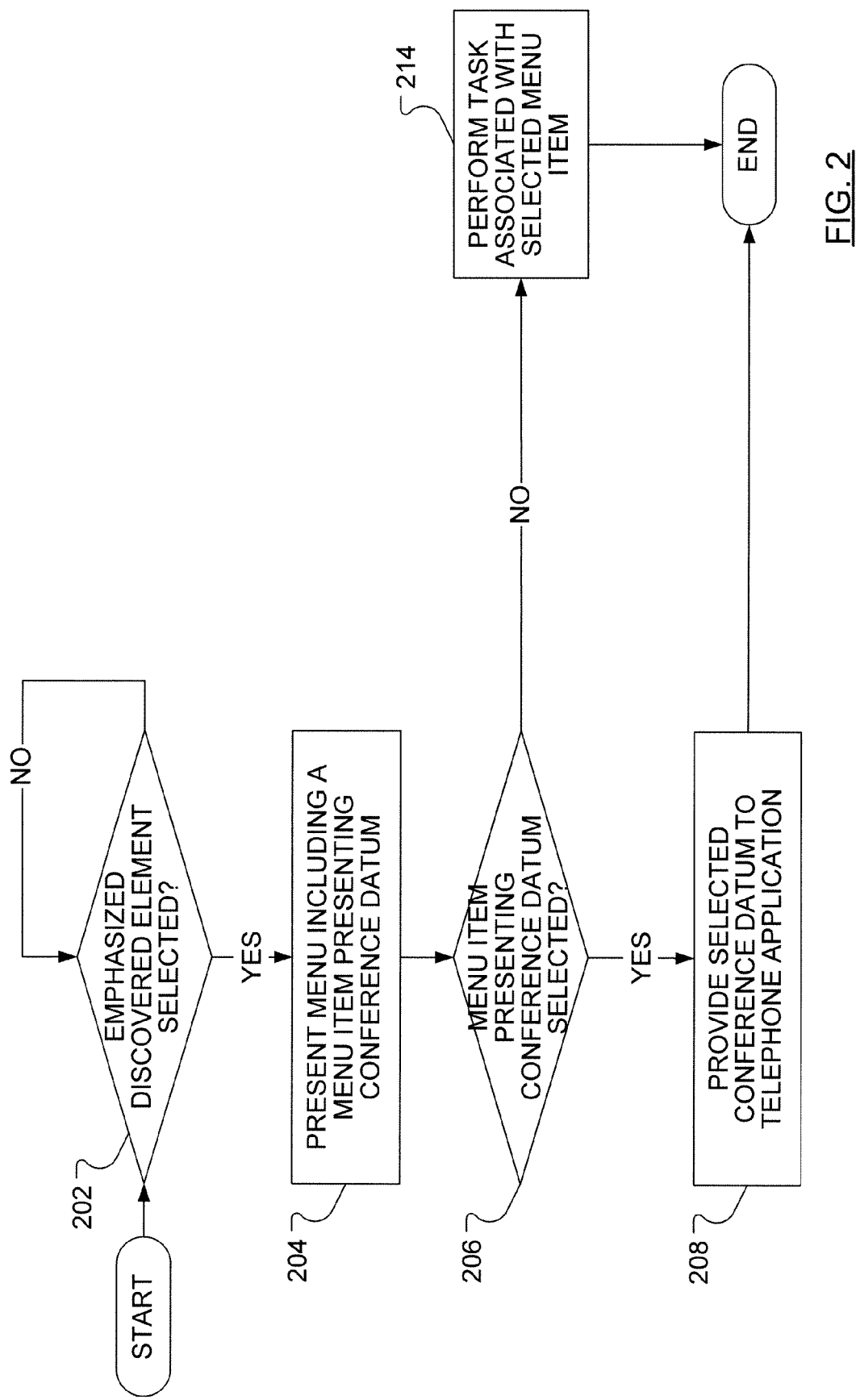
FIG. 2 illustrates steps in a method of operation of an action element of a user interface of a communication device.
Figure 5:
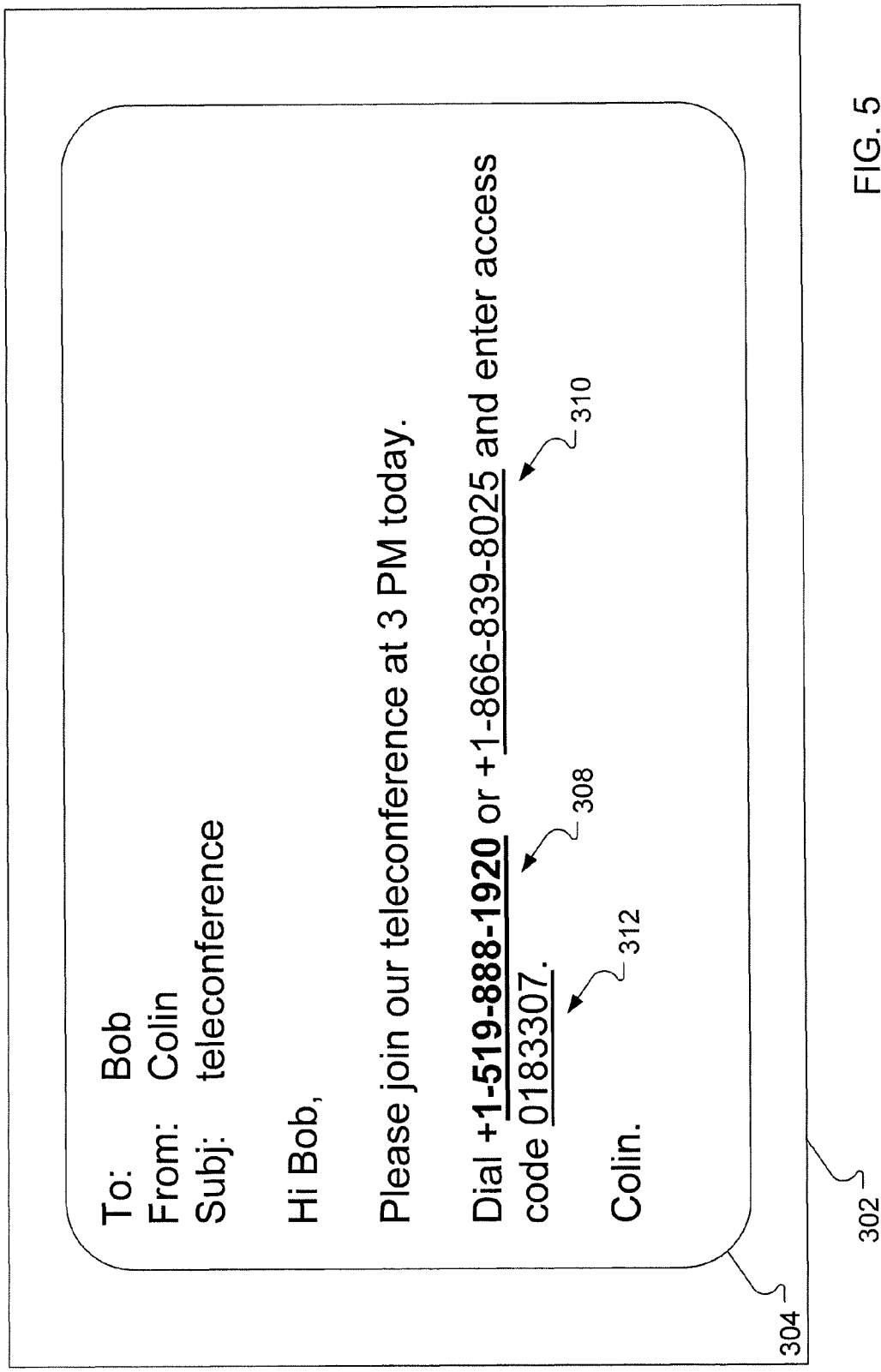
FIG. 5. illustrates the simplified communication device of FIG. 3, where a focus has been placed on a first string of characters among the conference datum.
Figure 6:
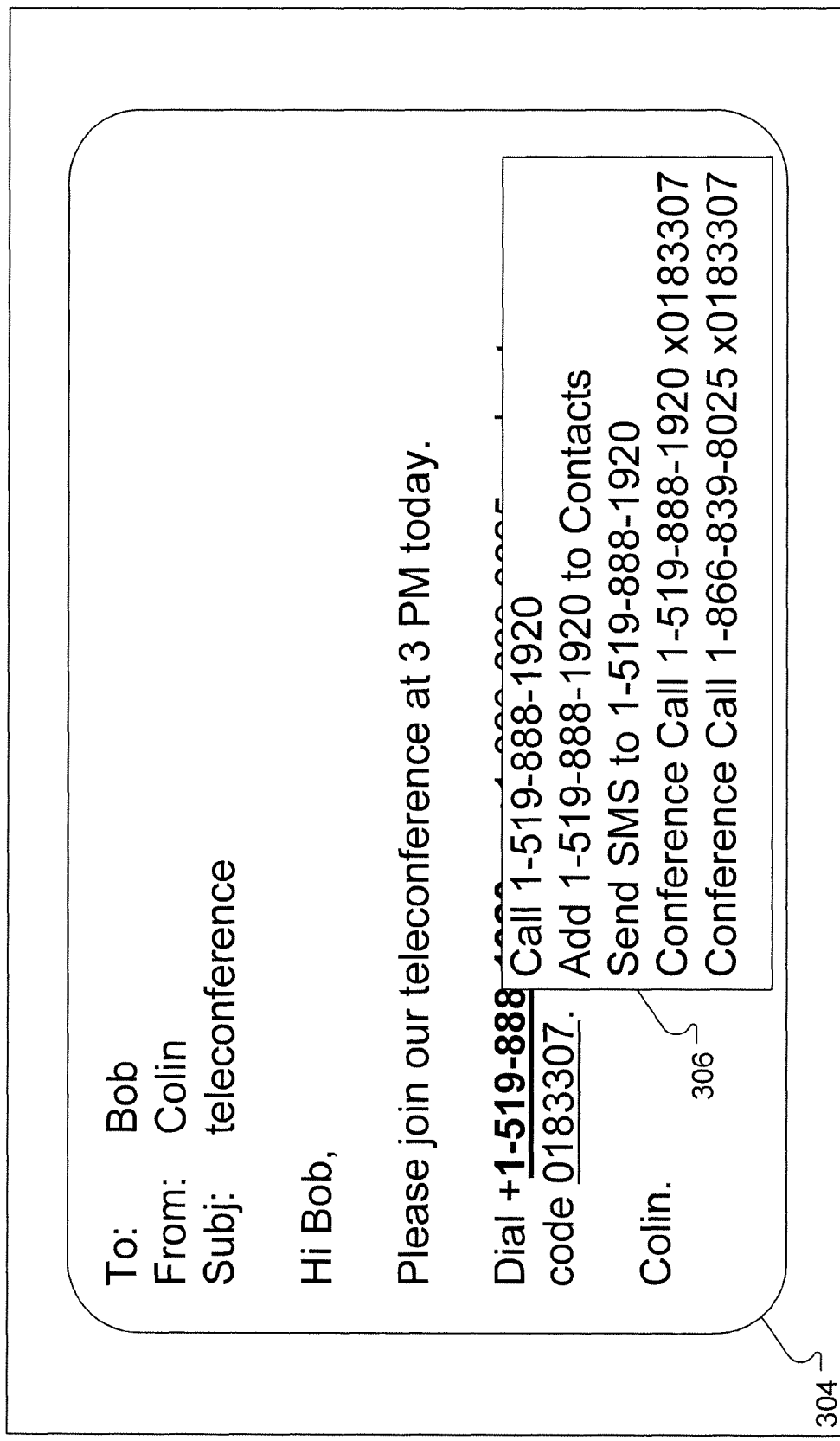
FIG. 6. illustrates the simplified communication device of FIG. 3, where selection of the first string of characters has resulted in the presentation of a menu.

Exemplary steps in a method of operation of the action element, which are outlined in FIG. 2, may be considered in conjunction with FIGS. 5 and 6, which continue to use the simplified illustration of the communication device 302 and the display 304 of FIG. 3.

Initially, it is determined whether one of the discovered elements (i.e., the first telephone number 308, the second telephone number 310 or the access code 312) has been selected (step 202). Selecting a discovered element may, for instance, require two activities on the part of the user.

In the first step, the user uses the user interface to focus on a particular discovered element. As discussed hereinbefore, such indicating may include scrolling the display until the appearance of particular discovered element is altered by the UI. FIG. 5 illustrates a case wherein a user has focused on the first telephone number 308 and, consequently, the first telephone number 308 has been further emphasized by rendering in bold type.

In the second step, the user uses the user interface to indicate that further acts are to be performed. As discussed hereinbefore, such further activity may include clicking a button on a mouse, depressing a joystick on a mobile telephone or placing inward pressure on a side-mounted thumbwheel on a mobile communication device.

Responsive to determining that a particular discovered element has been selected, the action element may present a menu (step 204) to the user. FIG. 6 illustrates a case wherein a user has selected the first telephone number 308 and, consequently, a menu 306 has be presented. The presentation of a menu is known. However, according to aspects of the present invention, the menu 306 in FIG. 6 includes additional menu items specifically related to joining conference calls.

The additional menu items are derived from the discovered elements (i.e., the conference datum). In particular, each additional menu item includes a potential telephone number paired with a potential passcode.

The user may review the menu 306 and use the user interface to select a particular menu item. If it is determined (step 206) that the particular menu item selected by the user includes conference datum; the action element may provide the selected conference datum to the telephone application (step 208). In providing the selected conference datum to the telephone application, the action element may separate the telephone number and the passcode by one or more "pause" characters indicating to the telephone application to transmit the passcode a timed delay after transmitting the telephone number. Such a timed delay may accommodate a delay in connecting the communication device to the conference bridge. After providing the conference datum to the telephone application, the activities of the action element may be considered to be complete.

Alternatively, the action element may provide the telephone number portion of the conference datum to the telephone application. After waiting a predetermined waiting period that allows the telephone application to connect to the conference bridge, the action element may provide the passcode portion of the conference datum to the telephone application.

If it is determined (step 206) that the particular menu item selected by the user does not include conference datum; a task associated with the menu item is performed (step 214). However, the performance of such other tasks is beyond the scope of this application.

As will be apparent to a person of ordinary skill in the art, the combination of a telephone number and additional digits may not necessarily relate to a conference bridge and passcode. Instead, the telephone number may be for a switchboard and the additional digits may represent a telephone extension. Additionally, instead, the telephone number may be for an automated interactive voice response (IVR) system and the additional digits may represent menu selections.

Other modifications will be apparent to those skilled in the art and, therefore, the invention is defined in the claims.

I claim:

1. A method of initiating a telephone call on a communication device, said method comprising:
   at a processor of said communication device:
   recognizing, as a telephone number, a first string of characters in a collection of characters in an application executed by said communication device and displayed on a display of said communication device wherein said telephone number is associated with a conference bridge;
   recognizing, as additional information related to said telephone number, a second string of characters in said collection of characters and displayed on said display wherein said additional information is a passcode associated with said telephone number;
   establishing a selectable item including said first string of characters; and
   responsive to determining that a user has selected said selectable item, providing said first string of characters and said second string of characters to a telephone calling application of said communication device, wherein said second string of characters is provided automatically based on said selection of said selectable item.

2. The method of claim 1 wherein said providing comprises separating said first string of characters and said second string of characters by a specific character indicating to said telephone application to transmit said second string of characters a timed delay after transmitting said first string of characters.

3. The method of claim 1 wherein said providing comprises providing said second string of characters a timed delay after providing said first string of characters.

4. The method of claim 1 further comprising, responsive to said recognizing said first string of characters, altering said display to emphasize said first string of characters.

5. The method of claim 1 further comprising, responsive to said recognizing said second string of characters, altering said display to emphasize said second string of characters.

6. The method of claim 5 where said altering comprises underlining said second string of characters.

7. The method of claim 5 further comprising:
   determining that a user has focused attention on said second string of characters; and
   further altering said display to further emphasize said second string of characters.

8. The method of claim 7 wherein said further altering comprises rendering said second string of characters in bold type.

9. The method of claim 1 wherein said telephone number is a first telephone number and said method further comprises recognizing, as a second telephone number, a third string of characters in a collection of characters in an application executed by said communication device and displayed on said display.

10. The method of claim 1 wherein said passcode is associated with a particular conference call.

11. The method of claim 1 wherein said recognizing said second string of characters as said additional information comprises considering a fixed number of characters succeeding said first string of characters.

12. A non-transitory computer readable medium containing computer-executable instructions that, when performed by a processor in a communication device, cause said processor to:
   recognize, as a telephone number, a first string of characters in a collection of characters in an application executed by said communication device and displayed on a display of said communication device wherein said telephone number is associated with a conference bridge;
   recognize, as additional information related to said telephone number, a second string of characters in said collection of characters and displayed on said display wherein said additional information is a passcode associated with said telephone number;
   establish a selectable item including said first string of characters; and
   responsive to determining that a user has selected said selectable item, provide said first string of characters and said second string of characters to a telephone calling application of said communication device, wherein said second string of characters is provided automatically based on said selection of said selectable item.

13. A communication device comprising:
   a processor adapted to:
   recognize, as a telephone number, a first string of characters in a collection of characters in an application executed by said communication device and displayed on a display of said communication device wherein said telephone number is associated with a conference bridge;
   recognize, as additional information related to said telephone number, a second string of characters in said collection of characters and displayed on said display wherein said additional information is a passcode associated with said telephone number;

establish a selectable item including said first string of characters; and responsive to determining that a user has selected said selectable item, provide said first string of characters and said second string of characters to a calling telephone application of said communication device, wherein said second string of characters is provided automatically based on said selection of said selectable item.

14. A communication device comprising:

a display;

a processor adapted to execute a first application to:

recognize, as a telephone number, a first string of characters in a collection of characters in an application executed by said communication device and displayed on said display of said communication device wherein said telephone number is associated with a conference bridge;

recognize, as additional information related to said telephone number, a second string of characters in said collection of characters and displayed on said display wherein said additional information is a passcode associated with said telephone number;

cause a menu to be displayed on said display, where said menu includes a menu item including said first string of characters; and responsive to determining that a user has selected said menu item, provide said first string of characters and said second string of characters to a calling telephone application of said communication device, wherein said second string of characters is provided automatically based on said selection of said menu item.

15. A method of initiating a telephone call on a communication device, said method comprising:

parsing text in an application executed by said communication device and displayed on a display of said communication device for a sequence of characters meeting first pre-defined criteria indicative that said sequence of characters represents a telephone number associated with a conference bridge;

on identifying a first sequence of characters meeting first pre-defined criteria, selecting a search zone as a pre-defined number of characters subsequent to said first sequence of characters;

parsing text in said search zone for a further sequence of characters meeting either said first pre-defined criteria or a second pre-defined criteria indicative that said further sequence of characters represent a passcode;

if a second sequence of characters meeting said second pre-defined criteria is identified in said search zone, establishing a selectable item including said first sequence of characters and, responsive to a user selection of said selectable item, providing said first string of characters and said second string of characters to a telephone calling application of said communication device, wherein said second string of characters is provided automatically based on said user selection.

16. The method of claim 15 further comprising emphasizing said first sequence of characters and said second sequence of characters.

17. The method of claim 15 where said pre-defined number of characters is a number of characters between ten and one hundred characters.

18. The method of claim 15 where said pre-defined number of characters is a number of characters between forty and eighty characters.

19. The method of claim 15 wherein said application is an email application.

20. The method of claim 15 wherein said search zone is a first search zone and further comprising:

if a third sequence of characters meeting said first pre-defined criteria is identified in said search zone, establishing said first sequence of characters, said second sequence of characters, and said third sequence of characters as selectable items.

21. The method of claim 20 further comprising:

selecting a second search zone as said pre-defined number of characters subsequent to the last of any said second sequence of characters and any said third sequence of characters and parsing text in said second search zone for a further sequence of characters meeting either said first pre-defined criteria or a second pre-defined criteria.

22. A method of initiating a telephone call on a communication device, said method comprising:

at a processor of said communications device:

recognizing, as a telephone number, a first string of characters in a collection of characters in an application executed by said communication device and displayed on a display of said communication device wherein said telephone number is associated with a conference bridge;

recognizing, as additional information related to said telephone number, a second string of characters in said collection of characters and displayed on said display wherein said additional information represents additional digits associated with said telephone number;

establishing a selectable item including said first string of characters; and responsive to determining that a user has selected said selectable item, providing said first string of characters and said second string of characters to a telephone calling application of said communication device, wherein said second string of characters is provided automatically based on said selection of said selectable item.

* * * * *